Aug. 30, 1932.  A. C. MULLER  1,875,108
DENTAL GUARD
Filed Sept. 22, 1931
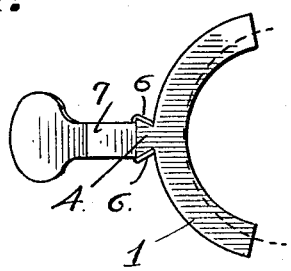
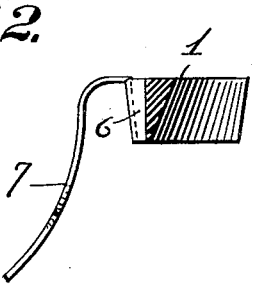
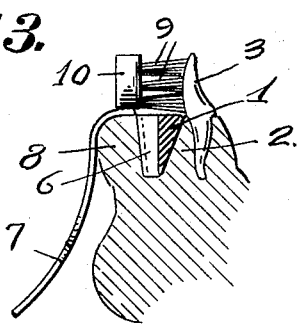
INVENTOR.
ALFRED C. MULLER.
BY Arthur L. Slee.
HIS ATTORNEY.

Patented Aug. 30, 1932

1,875,108

UNITED STATES PATENT OFFICE

ALFRED C. MULLER, OF CHICO, CALIFORNIA

DENTAL GUARD

Application filed September 22, 1931. Serial No. 564,274.

My invention relates to improvements in dental guards wherein an arcuate flexible member covers and embraces the gums adjacent the teeth to prevent contact of the bristles of a tooth-brush with the adjacent gums while the teeth are being brushed, and also to serve as a support and guide for the reciprocatory motion of the brush.

The primary object of the present invention is to provide a new and improved dental guard for preventing contact of the bristles of a tooth-brush with the adjacent gums, while the teeth are being brushed.

Another object is to provide a new and improved device of the character described which is arranged to resiliently embrace the gums in order to efficiently cover and protect the same from contact with a tooth-brush.

A further object is to provide a new and improved device of the type set forth, which is simple and economical in construction and operation, which may be easily operated, produced at a low cost, and also provide a maximum efficiency.

A still further object is to provide a new and improved dental guard which will fit comfortably between the gums and the adjacent lips.

I accomplish these and other objects by means of the improved device disclosed in the drawing forming a part of the present application wherein like characters of reference are used to designate similar parts throughout the specification and drawing, and in which—

Fig. 1 is a plan view of my improved device;

Fig. 2 is a side elevation, partly in section, disclosing the cross sectional area or shape of the guard; and Fig. 3 is a view similar to Fig. 2 but disclosing the application and operation of the device.

Referring to the drawing, the numeral 1 is used to designate a flexible arcuate member, made preferably of rubber or any other suitable material.

The diameter of the arc of the member 1 is preferably of smaller diameter than the diameter of the arc of the teeth being brushed, said tooth-arc diameter being designated in dotted lines in Fig. 1 of the drawing, in order that the guard or member 1 may be slightly expanded when applied to the larger arc of the teeth, and thereby be caused to embrace and, therefore, effectually cover the gums 2 adjacent the teeth 3 of an operator, when the device is in use, as hereinafter more specifically set forth.

Arranged approximately centrally of the periphery of the member 1 I have provided a dovetailed tenon 4, which tenon 4 is also preferably tapered downwardly to limit the movement thereof within converging clamping or engaging members 6 formed integral with a suitable detachable handle 7, by means of which handle the device may be effectively held in operative position within the mouth.

The guard or member 1 is also preferably triangular in cross section, as illustrated in Figs. 2 and 3 of the drawing, in order that the said member 1 may be positioned between the gums 2 and outer lip 8 of an operator without unduly distending said lip 8, thereby preventing discomfort to the wearer.

In operation, the member 1 is placed, conveniently by means of the handle 7, between the gums 2 and outer lip 8 with the apex of the triangular section downwardly, or in the bottom of the recess formed between the said gums 2 and lip 8, as disclosed in Fig. 3 of the drawing. As the flexible arcuate member 1 is placed in position the arcuate form thereof, having a smaller diameter than the diameter of the curvature of the teeth 3 being brushed, is slightly expanded, and the reaction to such expansion readily causes the said arcuate flexible member 1 to snugly cover and embrace the gums 2 adjacent the teeth 3.

When the guard is thus placed in position the gums 2 are effectively embraced and covered and the bristles 9 of the tooth-brush 10, designated in Fig. 3 of the drawing, are now placed upon the upper edge of the guard or member 1 and the teeth are brushed with the usual reciprocatory movement, the guard member 1 meanwhile effectively embracing and covering the gums 2 and thereby preventing contact of the bristles 9 with said gums 2.

The upper surface of the member 1 also serves as a guide for the tooth-brush 10 and its movement whereby the brushing of the teeth may be facilitated.

While I have shown the member 1 to be triangular in cross section, I do not find that such a section is absolutely necessary, and it should be particularly noted that I do not confine my invention to this restriction, but I find it more conformable to the recess between the gums and the lip, and therefore more comfortable to the operator.

Having thus described my invention what I claim as new and desire to secure by Letters Patent is—

1. A dental guard comprising a flexible arcuate member, triangular in cross section, arranged to cover and embrace the gums adjacent the teeth to prevent contact of the bristles of a tooth-brush with said gums while said teeth are being brushed, the apex of said triangular cross section resting in the bottom of the recess between the lower portion of said gums and an adjacent lip, to prevent discomfort.

2. A dental guard comprising a flexible arcuate member, triangular in cross section, arranged to cover and embrace the gums adjacent the teeth to prevent contact of the bristles of a tooth-brush with said gums while said teeth are being brushed, the apex of said triangular cross section resting in the bottom of the recess between the lower portion of said gums and an adjacent lip, to prevent discomfort; and means for holding said guard in operative position.

3. A dental guard comprising a flexible arcuate member, triangular in cross section, arranged to cover and embrace the gums adjacent the teeth to prevent contact of the bristles of a tooth-brush with said gums while said teeth are being brushed, the apex of said triangular cross section resting in the bottom of the recess between the lower portion of said gums and an adjacent lip, to prevent discomfort; and a handle detachably connected to said guard to hold the same in operative position.

In witness whereof, I hereunto set my signature,

ALFRED C. MULLER.